US012716747B2

(12) United States Patent
Shen et al.

(10) Patent No.: US 12,716,747 B2
(45) Date of Patent: Aug. 25, 2026

(54) HIGH-PRECISION MAP CONSTRUCTION METHOD, ELECTRONIC DEVICE, AND STORAGE MEDIUM

(71) Applicant: Beijing Baidu Netcom Science Technology Co., Ltd., Beijing (CN)

(72) Inventors: Shougang Shen, Beijing (CN); Kai Zhong, Beijing (CN); Dingfu Zhou, Beijing (CN); Junjie Cai, Beijing (CN); Jianzhong Yang, Beijing (CN); Zhen Lu, Beijing (CN); Tongbin Zhang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 436 days.

(21) Appl. No.: 18/077,896

(22) Filed: Dec. 8, 2022

(65) Prior Publication Data

US 2023/0184564 A1 Jun. 15, 2023

(30) Foreign Application Priority Data

Dec. 10, 2021 (CN) ........................ 202111505203.2

(51) Int. Cl.
*G01C 21/00* (2006.01)
*G01C 21/32* (2006.01)
(Continued)

(52) U.S. Cl.
CPC ......... *G01C 21/3848* (2020.08); *G01C 21/32* (2013.01); *G06T 7/55* (2017.01);
(Continued)

(58) Field of Classification Search
CPC .... G01C 21/3848; G01C 21/32; G01C 21/28; G01C 21/3852; G06T 7/55; G06T 7/70;
(Continued)

(56) References Cited

U.S. PATENT DOCUMENTS

2014/0293016 A1* 10/2014 Benhimane ............. G06T 7/246 348/50
2020/0288112 A1* 9/2020 Sheng .................. H04N 13/296

FOREIGN PATENT DOCUMENTS

CN 110148179 A 8/2019
CN 111582204 A 8/2020
(Continued)

OTHER PUBLICATIONS

English translation of Yan (WO2020098316A1) (Year: 2025).*
(Continued)

*Primary Examiner* — Scott A Browne
*Assistant Examiner* — Shahira Baajour
(74) *Attorney, Agent, or Firm* — NORTON ROSE FULBRIGHT US LLP

(57) ABSTRACT

Provided are a high-precision map construction method, an electronic device, and a storage medium, relating to the field of high-precision map technology and, in particular, to autonomous driving technology. The implementation solution includes: calculating a pose of a camera at each position point according to a pre-acquired video; calculating an absolute depth of each keypoint in the pre-acquired video according to the pose of the camera at each position point; constructing, according to the absolute depth of each keypoint in the video, a corresponding three-dimensional point cloud of each pixel point in the pre-acquired video; and constructing, according to the corresponding three-dimensional point cloud of each pixel point in the pre-acquired video, a high-precision map corresponding to the pre-acquired video.

12 Claims, 5 Drawing Sheets

(51) Int. Cl.
*G06T 7/55* (2017.01)
*G06T 7/70* (2017.01)

(52) U.S. Cl.
CPC ...... *G06T 7/70* (2017.01); *G06T 2207/10016* (2013.01); *G06T 2207/10028* (2013.01); *G06T 2207/30244* (2013.01)

(58) Field of Classification Search
CPC . G06T 2207/10016; G06T 2207/10028; G06T 2207/30244; G06T 7/579; G06T 7/73; G06T 17/05; G06T 2207/10024; G06F 18/22
See application file for complete search history.

(56) References Cited

FOREIGN PATENT DOCUMENTS

| | | | | | |
|---|---|---|---|---|---|
| CN | 112700546 A | * | 4/2021 | ............ G06N 3/045 |
| CN | 110287276 B | | 8/2021 | |
| CN | 113326769 A | | 8/2021 | |
| CN | 113496503 A | | 10/2021 | |
| WO | 2020098316 A1 | | 5/2020 | |

OTHER PUBLICATIONS

English translation of CN112700546A (Year: 2025).*
Wang, J., & wan, W. (2022). Research on the effectiveness of monocular visual slam depth estimation base on improved Orb algorithm. Proceedings of International Conference on Artificial Life and Robotics, 27, 318-322. https://doi.org/10.5954/icarob.2022.os34-2 (Year: 2022).*
"Processing and Interpretation of Remote Sensing Images in Coastal Zone of Offshore Islands in China", China Offshore Ocean, (2016), Ed. Jiang Xingwei, Haihun Publ., Beijing, p. 208, with English translation.
"Simulation Technology of Automobile Intelligent Driving," Series of Teaching Materials for New Engineering Automobiles in General Higher Education, (2021), Ed. Weiwen and Bingtao, Machinery Ind. Press, p. 099, with English Translation.
Supplemental Search Report issued by CIPO on Sep. 23, 2023 in corresponding Patent Application No. 202111505203.2, with English translation.
Office Action issued by CIPO on Sep. 25, 2023 in corresponding Patent Application No. 202111505203.2, with English translation.
Search Report issued on May 29, 2023 by the CIPO in the corresponding Patent Application No. 202111505203.2, with English translation.
Office Action issued on Jun. 5, 2023 by the CIPO in the corresponding Patent Application No. 202111505203.2, with English translation.
European Search Report issued on May 2, 2023 in the corresponding Patent Application No. 22212324.2-1009.
Javadnejad, et al.: "A photogrammetric approach to fusing natural colour and thermal infrared UAS imagery in 3D point cloud generation," Internal Journal of Remote Sensing, 41(1), (2020), pp. 211-237.
Zhanabatyrova, et al.: "Automatic Map Update Using Dashcam Videos," arXiv:2109.1213v1, (2021), pp. 1-14.
Zhihu, Zhuanlan: Visual SLAM Lecture, published on Aug. 19, 2021: <https://zhuanlan.zhihu.com/p/400378246> , with English translation, pp. 1-10.
Hasheminasab Seyyed Meghdad et al: "GNSS/INS-AssistedStructure from Motion Strategies for UAV-Based Imagery over Mechanized Agricultural Fields", Remote sensing (Basel, Switzerland), vol. 12, No. 3, Jan. 21, 2020 (Jan. 21, 2020), p. 351,XP093275497,BaselISSN: 2072-4292, DOI: 10.3390/rs12030351.
Communication pursuant to Article 94(3)EPC for European Patent Application No. 22212324.2, mailed May 15, 2025, 8 pages.

* cited by examiner

HIGH-PRECISION MAP CONSTRUCTION METHOD, ELECTRONIC DEVICE, AND STORAGE MEDIUM

CROSS-REFERENCE TO RELATED APPLICATION(S)

This application claims priority to Chinese Patent Application No. 202111505203.2 filed Dec. 10, 2021, the disclosure of which is incorporated herein by reference in its entirety.

TECHNICAL FIELD

The present disclosure relates to the field of high-precision map technology, further relates to autonomous driving technology, and in particular relates to a high-precision map construction method and apparatus, an electronic device, and a storage medium.

BACKGROUND

High-precision maps, also referred to as high-resolution maps, have very important applications in autonomous driving. Requirements for a high-precision map are higher than those for an ordinary navigation map. The high-precision map needs to achieve centimeter-level accuracy. In a real road scene, actual road situations are updated frequently, and the high-precision map needs to ensure the safety of the autonomous driving. Therefore, it is necessary to ensure that the high-precision map is updated in time when the actual driving environment changes.

In the process of updating the high-precision map, it is very important to position the longitude and latitude of an element such as a guideboard, a traffic light, a lane line, and a road sign. The accuracy with which these elements are positioned has a relatively significant influence on the subsequent construction of map data. The accurate positioning of the map elements not only can ensure the accuracy with which the high-precision map is updated but also has very great significance in the process of constructing the high-precision map. Improving the precision with which the map elements are positioned is still a problem to be solved.

In the process of constructing the high-precision map at the present stage, laser point cloud data is typically used for constructing the map, that is, semantic parsing is performed on a laser point cloud so that the category attribute of each point in the laser point cloud is identified, and then vectorization is performed on the laser point cloud so that a vectorized map of a target region is obtained. Since a laser device has a relatively high cost, large-scale deployment cannot be performed. How to construct the map at a low cost is a problem to be solved.

SUMMARY

The present disclosure provides a high-precision map construction method and apparatus, an electronic device, and a storage medium.

In a first aspect, the present application provides a high-precision map construction method, and the method includes the steps described below.

A pose of a camera at each position point is calculated according to a pre-acquired video.

An absolute depth of each keypoint in the video is calculated according to the pose of the camera at each position point.

A corresponding three-dimensional point cloud of each pixel point in the video is constructed according to the absolute depth of each keypoint in the video.

A high-precision map corresponding to the video is constructed according to the corresponding three-dimensional point cloud of each pixel point in the video.

In a third aspect, an embodiment of the present application provides an electronic device.

The electronic device includes one or more processors and a memory.

The memory is configured to store one or more programs.

The one or more programs are executed by the one or more processors to cause the one or more processors to implement the high-precision map construction method according to any embodiment of the present application.

In a fourth aspect, an embodiment of the present application provides a storage medium storing a computer program. When executed by a processor, the program implements the high-precision map construction method according to any embodiment of the present application.

According to the technology of the present application, the technical problems are solved that in the related art, laser point cloud data is used for constructing a map with high-cost devices and therefore, large-scale deployment cannot be performed and the timeliness and update range of map construction cannot be ensured. According to the technical solutions provided by the present application, the high-precision map can be constructed with low-cost devices, thereby ensuring the timeliness and update range of the map construction and facilitating large-scale popularization and application.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the solution and not to limit the present disclosure. In the drawings.

DETAILED DESCRIPTION

Example embodiments of the present disclosure, including details of embodiments of the present disclosure, are described hereinafter in conjunction with the drawings to facilitate understanding. The example embodiments are illustrative only. Therefore, it is to be appreciated by those of ordinary skill in the art that various changes and modifications may be made to the embodiments described herein without departing from the scope and spirit of the present disclosure. Similarly, the description of well-known functions and constructions is omitted hereinafter for clarity and conciseness.

Embodiment One

Figure 1:
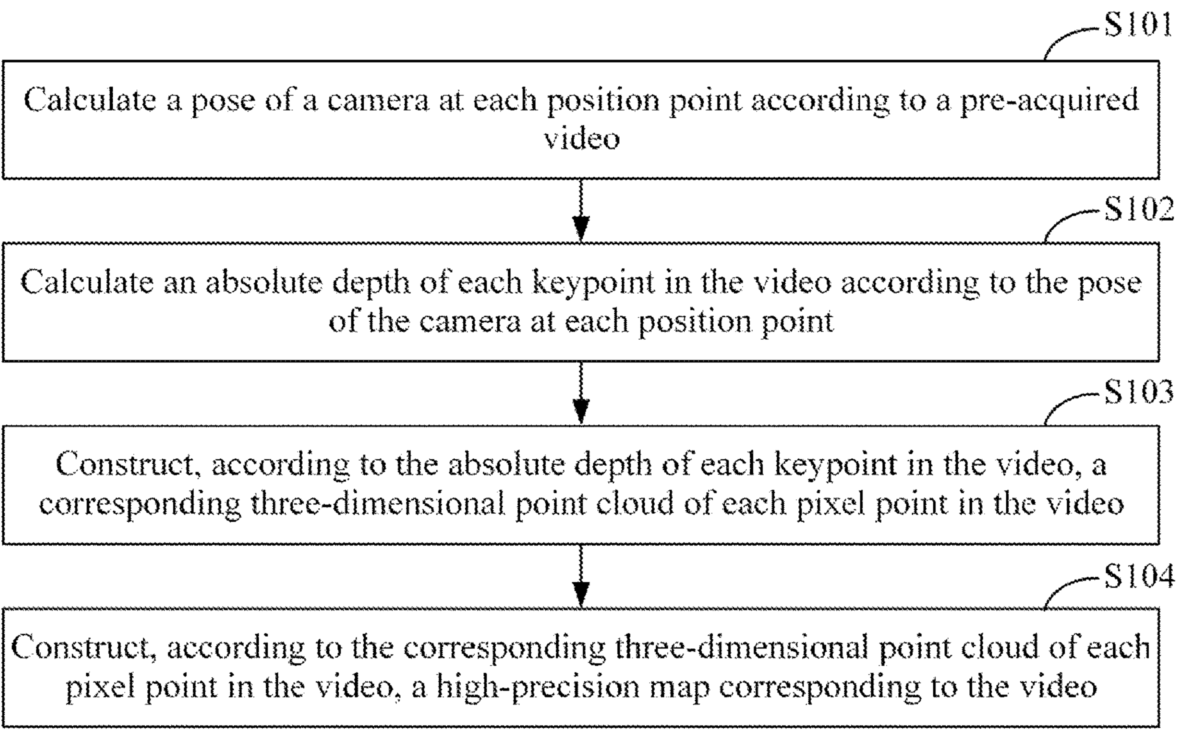
FIG. 1 is a first flowchart of a high-precision map construction method according to an embodiment of the present application.

FIG. 1 is a first flowchart of a high-precision map construction method according to an embodiment of the present application. The method may be executed by a high-precision map construction apparatus or an electronic device. The apparatus or the electronic device may be implemented as software and/or hardware. The apparatus or the electronic device may be integrated in any intelligent device having a network communication function. As shown in FIG. 1, the high-precision map construction method may include the steps described below.

In S101, a pose of a camera at each position point is calculated according to a pre-acquired video.

In this step, the electronic device may calculate the pose of the camera at each position point according to the pre-acquired video. The pose in the embodiment of the present application may include degrees of freedom in which the camera moves along directions of three orthogonal coordinate axes X, Y, and Z and degrees of freedom in which the camera rotates around the three orthogonal coordinate axes X, Y, and Z. Specifically, the electronic device may extract Global Positioning System (GPS) information and inertial measurement unit (IMU) data of the camera at each position point according to the video; and then the electronic device may acquire the pose of the camera at each position point according to the GPS information and the IMU data of the camera at each position point.

In S102, an absolute depth of each keypoint in the video is calculated according to the pose of the camera at each position point.

In this step, the electronic device may calculate the absolute depth of each keypoint in the video according to the pose of the camera at each position point. The absolute depth in the embodiment of the present application refers to an image depth of each keypoint in an image in the video. The image depth refers to the number of bits used for storing each pixel and is also used for measuring the color resolution of an image. The image depth is used to determine the number of colors which each pixel of a color image may have or the number of grayscale levels which each pixel of a grayscale image may have. The image depth determines the maximum number of colors which may appear in the color image or a maximum grayscale level in the grayscale image. Specifically, the electronic device may extract two images from the video as a current image pair, where the current image pair includes a first current image and a second current image. Then, the electronic device may separately extract at least one keypoint from the first current image and at least one keypoint from the second current image and may match each keypoint in the first current image with each keypoint in the second current image. If at least one keypoint existing in the first current image is matched with at least one keypoint in the second current image successfully, the electronic device may calculate an absolute depth of each successfully-matched keypoint in the first current image according to a pose of the camera at a position point at which the first current image is shot and an absolute depth of each successfully-matched keypoint in the second current image according to a pose of the camera at a position point at which the second current image is shot.

In S103, a corresponding three-dimensional point cloud of each pixel point in the video is constructed according to the absolute depth of each keypoint in the video.

In this step, the electronic device may construct the corresponding three-dimensional point cloud of each pixel point in the video according to the absolute depth of each keypoint in the video. A depth image, also referred to as a range image, refers to an image in which the value of a distance (depth) from an image acquisition device to each point in a scene is used as a pixel value. A point cloud refers to that a reflected laser carries information such as an orientation and a distance when a laser beam irradiates the surface of an object. If a scan is performed with the laser beam along a certain track, information about reflected laser points is recorded while the scan is performed. Since the scan is extremely fine, a large number of laser points can be obtained so that a laser point cloud can be formed. The depth image may be calculated as point cloud data through a coordinate transformation. In an image frame provided by a depth data stream, the pixel value of each pixel point represents a distance from a particular coordinate (x, y) in the scene to the image acquisition device in the field of view of the image acquisition device.

In S104, a high-precision map corresponding to the video is constructed according to the corresponding three-dimensional point cloud of each pixel point in the video.

In this step, the electronic device may construct the high-precision map corresponding to the video according to the corresponding three-dimensional point cloud of each pixel point in the video. Specifically, the electronic device may acquire a three-dimensional point cloud of each map element in each image according to a predetermined correspondence relationship between each pixel point and the corresponding three-dimensional point cloud, then may perform a vectorization operation on the three-dimensional point cloud of each map element so that a vectorization result of each map element is acquired, and may construct, according to the vectorization result of each map element, the high-precision map corresponding to the video.

According to the high-precision map construction method provided by the embodiment of the present application, the pose of the camera at each position point is calculated according to the pre-acquired video; the absolute depth of each keypoint in the video is calculated according to the pose of the camera at each position point; the corresponding three-dimensional point cloud of each pixel point in the video is constructed according to the absolute depth of each keypoint in the video; and the high-precision map corresponding to the video is constructed according to the corresponding three-dimensional point cloud of each pixel point in the video. That is, according to the present application, the video may be acquired with the low-cost devices, and the corresponding high-precision map is constructed according to the video. Thus, high-cost laser devices are not needed to construct the high-precision map. In an existing high-precision map construction method, the laser point cloud data is typically used for constructing the map, that is, the semantic parsing is performed on the laser point cloud so that the category attribute of each point in the laser point cloud is identified, and then the vectorization is performed on the laser point cloud so that the vectorized map of the target region is obtained. In the present application, the technical means is adopted that the pose of the camera at each position point and the absolute depth of the camera at each keypoint are calculated so that the corresponding three-dimensional point cloud of each pixel point is constructed and the high-precision map is finally constructed.

Therefore, the technical problems are overcome that in the related art, the laser point cloud data is used for constructing the map with the high-cost devices and therefore, the large-scale deployment cannot be performed and the timeliness and update range of the map construction cannot be ensured. According to the technical solutions provided by the present application, the high-precision map can be constructed with the low-cost devices, thereby ensuring the timeliness and update range of the map construction and facilitating the large-scale popularization and application. In addition, the technical solution in the embodiment of the present application is simple and convenient to implement and easy to popularize and has a wider application range.

Embodiment Two

Figure 2:
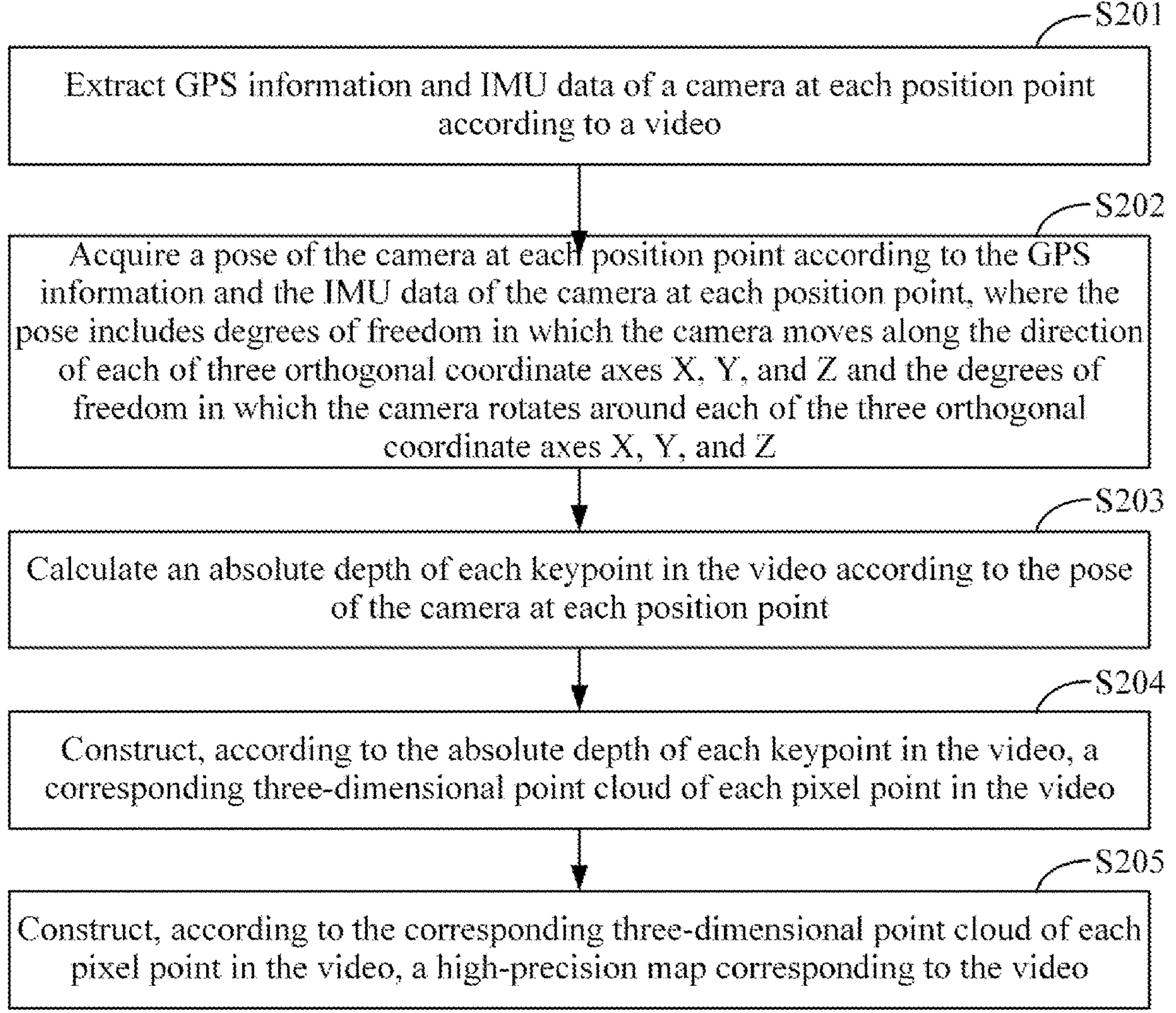
FIG. 2 is a second flowchart of a high-precision map construction method according to an embodiment of the present application.

FIG. 2 is a second flowchart of a high-precision map construction method according to an embodiment of the present application. This embodiment is an optimization and expansion of the preceding technical solution and can be combined with each preceding optional implementation. As shown in FIG. 2, the high-precision map construction method may include the steps described below.

In S201, the GPS information and the IMU data of the camera at each position point are extracted according to the video.

In this step, the electronic device may extract the GPS information and the IMU data of the camera at each position point according to the video. Specifically, images shot by a user at different position points may constitute a video which may include one or more images. For example, during the travel of a vehicle, the user may hold the camera and shoot a series of images at successive position points. These images constitute the video acquired by the vehicle during the travel. Each of the different position points corresponds to a different pose including the GPS information and the IMU data. For example, assuming that the video is acquired by the camera at N position points, the N position points may include a position point 1, a position point 2, . . . , and a position point N, where N is a natural number greater than 1. The position point 1 corresponds to GPS1 and IMU1; the position point 2 corresponds to GPS2 and IMU2, . . . ; and the position point N corresponds to GPS N and IMU N.

In S202, the pose of the camera at each position point is acquired according to the GPS information and the IMU data of the camera at each position point, where the pose includes the a degree of freedom in which the camera moves along the direction of each of the three orthogonal coordinate axes X, Y, and Z and the degree of freedom in which the camera rotates around each of the three orthogonal coordinate axes X, Y, and Z.

In this step, the electronic device may acquire the pose of the camera at each position point according to the GPS information and the IMU data of the camera at each position point, where the pose includes the degrees of freedom in which the camera moves along the directions of the three orthogonal coordinate axes X, Y, and Z and the degrees of freedom in which the camera rotates around the three orthogonal coordinate axes X, Y, and Z. For example, the pose of the camera at each position point may be denoted by $(X, Y, Z, \alpha, \beta, \gamma)$, where X, Y, and Z denotes the degrees of freedom in which the camera moves along the directions of the three orthogonal coordinate axes X, Y, and Z, respectively, and $\alpha$, $\beta$, and $\gamma$ denote the degrees of freedom in which the camera rotates around the three orthogonal coordinate axes X, Y, and Z, respectively. Specifically, the electronic device may use the IMU data for acquiring motion data of the camera in a local coordinate system in the manner of visual-inertial odometry and then may fuse the motion data of the camera in the local coordinate system and the GPS information to acquire motion data of the camera in a global coordinate system.

In S203, the absolute depth of each keypoint in the video is calculated according to the pose of the camera at each position point.

In this step, the electronic device may calculate the absolute depth of each keypoint in the video according to the pose of the camera at each position point. Specifically, the electronic device may extract the two images from the video as the current image pair, where the current image pair may include the first current image and the second current image. Then, the electronic device may extract the at least one keypoint from the first current image and the second current image separately and may match each keypoint in the first current image with each keypoint in the second current image. If the at least one keypoint existing in the first current image is matched with the at least one keypoint in the second current image successfully, the electronic device may calculate the absolute depth of each successfully-matched keypoint in the first current image and the absolute depth of each successfully-matched keypoint in the second current image according to the pose of the camera at the position point at which the first current image is shot and the pose of the camera at the position point at which the second current image is shot. Optionally, the electronic device may also remove, using a depth filtration method, three-dimensional points with inconsistent depths. Pixel points with inconsistent depths or depths of relatively low consistency are filtered through comparing consistency relationships between depths of diffused pixel points and depths of other feature points. Depth image fusion is performed on camera motion data obtained with a simultaneous localization and mapping (SLAM) model to acquire a three-dimensional point cloud model of a road scene.

In S204, the corresponding three-dimensional point cloud of each pixel point in the video is constructed according to the absolute depth of each keypoint in the video.

In S205, the high-precision map corresponding to the video is constructed according to the corresponding three-dimensional point cloud of each pixel point in the video.

In this step, the electronic device may construct the high-precision map corresponding to the video according to the corresponding three-dimensional point cloud of each pixel point in the video. Specifically, the electronic device may acquire the three-dimensional point cloud of each map element in each image according to the predetermined correspondence relationship between each pixel point and the corresponding three-dimensional point cloud, then may perform the vectorization operation on the three-dimensional point cloud of each map element so that the vectorization result of each map element is acquired, and may construct, according to the vectorization result of each map element, the high-precision map corresponding to the video. Further, the electronic device may perform semantic segmentation on each image in the video so that category information of each map element in each image is obtained, and then the electronic device may acquire the three-dimensional point cloud of each map element in the video according to the category information of each map element. Specifically, the following operation steps may be included: (1) the semantic or instance-level segmentation is performed on objects in the video through the semantic segmentation process or the instance segmentation process so that segmentation results of elements such as a lane line, a traffic light, and a guideboard may be obtained after dynamic objects are filtered out, thereby obtaining category information of different elements; (2) category information of the pixel point may be directly given to the three-dimensional point cloud according to the correspondence relationship between the point cloud after three-dimensional reconstruction and the pixel point so that a three-dimensional point cloud with semantic information can be obtained, and thus, the category attribute of each point in the three-dimensional point cloud is obtained and an identification result of the point cloud is obtained; (3) point clouds belonging to the same category are combined, and generally, point cloud clusters belonging to the same category may be obtained using a point cloud clustering method; and (4) the vectorization operation is performed on the preceding obtained point cloud clusters so that three-dimensional vectorization results of the point clouds are obtained. The vectorization results are generally classified into three-dimensional, planar, and linear types according to the characteristics of the point clouds and the elements. For example, the guideboard and the traffic light belong to the three-dimensional type, a sidewalk and a no-parking zone belong to the planar type, and the lane line and a road edge belong to the linear type. For the three-dimensional point clouds, three-dimensional bounding boxes of outer boundaries of the point clouds are used for performing the vectorization. The linear and planar point cloud clusters are denoted by three-dimensional bounding boxes of the linear and planar point cloud clusters and the three-dimensional bounding boxes are compressed according to the characteristics of the linear and planar types so that two-dimensional planar vectorization results are formed.

According to the high-precision map construction method provided by the embodiment of the present application, the pose of the camera at each position point is calculated according to the pre-acquired video; the absolute depth of each keypoint in the video is calculated according to the pose of the camera at each position point; the corresponding three-dimensional point cloud of each pixel point in the video is constructed according to the absolute depth of each keypoint in the video; and the high-precision map corresponding to the video is constructed according to the corresponding three-dimensional point cloud of each pixel point in the video. That is, according to the present application, the video may be acquired with the low-cost devices, and the corresponding high-precision map is constructed according to the video. Thus, the high-cost laser devices are not needed to construct the high-precision map. In the existing high-precision map construction method, the laser point cloud data is typically used for constructing the map, that is, the semantic parsing is performed on the laser point cloud so that the category attribute of each point in the laser point cloud is identified, and then the vectorization is performed on the laser point cloud so that the vectorized map of the target region is obtained. In the present application, the technical means is adopted that the pose of the camera at each position point and the absolute depth of the camera at each keypoint are calculated so that the corresponding three-dimensional point cloud of each pixel point is constructed and the high-precision map is finally constructed. Therefore, the technical problems are overcome that in the related art, the laser point cloud data is used for constructing the map with the high-cost devices and therefore, the large-scale deployment cannot be performed and the timeliness and update range of the map construction cannot be ensured. According to the technical solutions provided by the present application, the high-precision map can be constructed with the low-cost devices, thereby ensuring the timeliness and update range of the map construction and facilitating the large-scale popularization and application. In addition, the technical solution in the embodiment of the present application is simple and convenient to implement and easy to popularize and has the wider application range.

Embodiment Three

Figure 3:
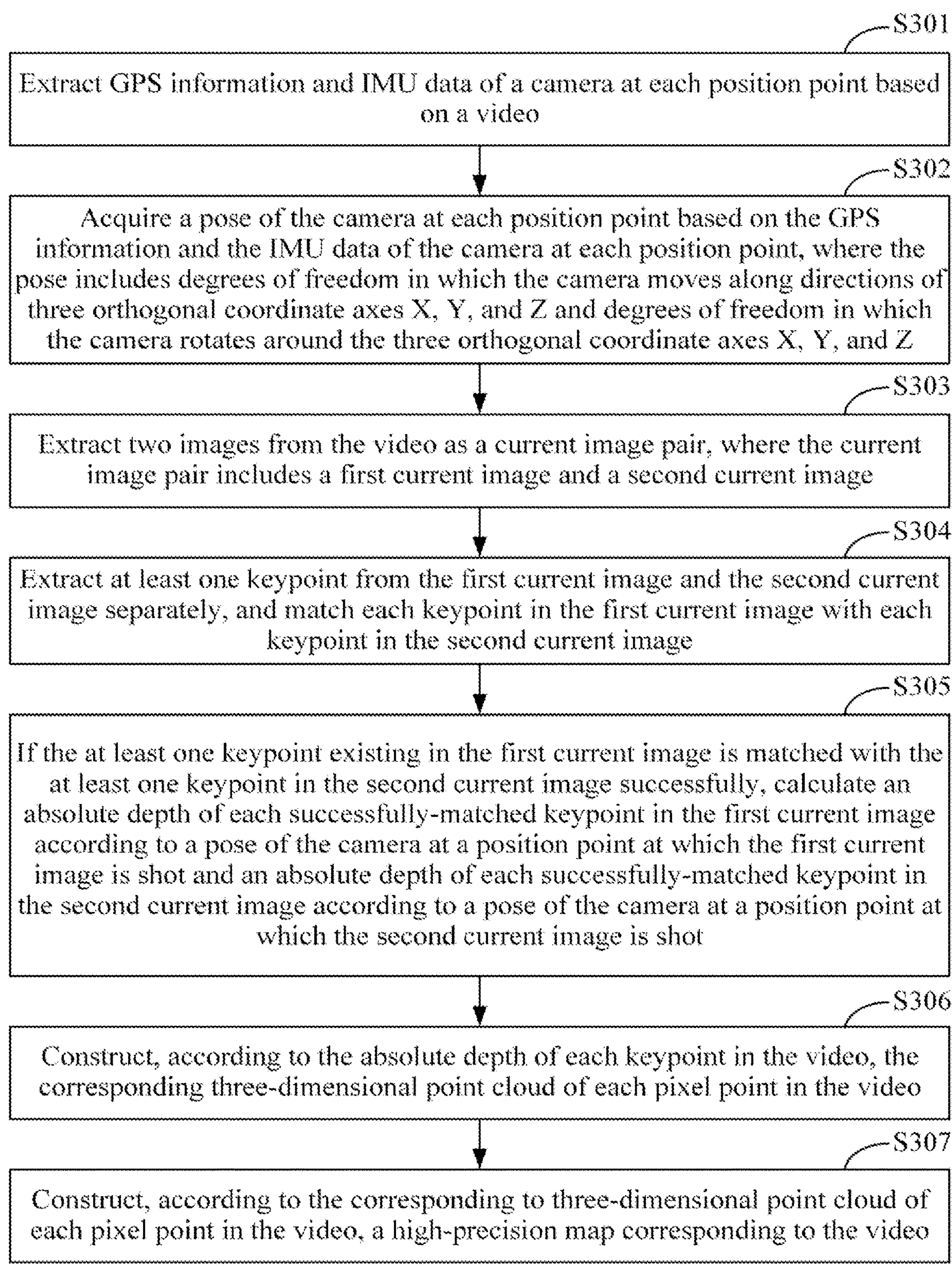
FIG. 3 is a third flowchart of a high-precision map construction method according to an embodiment of the present application.

FIG. 3 is a third flowchart of a high-precision map construction method according to an embodiment of the present application. This embodiment is an optimization and expansion of the preceding technical solution and can be combined with each preceding optional implementation. As shown in FIG. 3, the high-precision map construction method may include the steps described below.

In S301, the GPS information and the IMU data of the camera at each position point are extracted according to the video.

In S302, the pose of the camera at each position point is acquired according to the GPS information and the IMU data of the camera at each position point, where the pose includes the degree of freedom in which the camera moves along the direction of each of the three orthogonal coordinate axes X, Y, and Z and the degree of freedom in which the camera rotates around each of the three orthogonal coordinate axes X, Y, and Z.

In S303, the two images are extracted from the video as the current image pair, where the current image pair includes the first current image and the second current image.

In this step, the electronic device may extract the two images from the video as the current image pair, where the current image pair includes the first current image and the second current image. Specifically, the electronic device may use every two successive images as the image pair or may use two non-successive images as the image pair, which is not limited herein.

In S304, the at least one keypoint is extracted from the first current image and the at least one keypoint is extracted from the second current image, and each keypoint in the first current image is matched with each keypoint in the second current image.

In this step, the electronic device may extract the at least one keypoint from the first current image and the second current image separately and may match each keypoint in the first current image with each keypoint in the second current image. Specifically, the electronic device may match each keypoint in the first current image with each keypoint in the second current image. If a keypoint existing in the first current image is matched with a keypoint in the second current image successfully, it indicates that the two keypoints denote the same point on the object.

In S305, if the at least one keypoint existing in the first current image is matched with the at least one keypoint in the second current image successfully, the absolute depth of each successfully-matched keypoint in the first current image and the absolute depth of each successfully-matched keypoint in the second current image are calculated according to the pose of the camera at the position point at which the first current image is shot and the pose of the camera at the position point at which the second current image is shot.

In this step, if the at least one keypoint existing in the first current image is matched with the at least one keypoint in the second current image successfully, the electronic device may calculate the absolute depth of each successfully-matched keypoint in the first current image and the absolute depth of each successfully-matched keypoint in the second current image according to the pose of the camera at the position point at which the first current image is shot and the pose of the camera at the position point at which the second current image is shot. Specifically, the electronic device may construct pixel coordinates of the first current image and the second current image and normalized plane coordinates of pixel points in the first current image and the second current image according to the pose of the camera at the position point at which the first current image is shot and the pose of the camera at the position point at which the second current image is shot. Then, the electronic device may calculate the absolute depth of each successfully-matched keypoint in the first current image and the absolute depth of each successfully-matched keypoint in the second current image according to the pixel coordinates of the first current image and the second current image and the normalized plane coordinates of the pixel points in the first current image and the second current image. For example, a pixel coordinate of the first current image may be denoted as: $s_1p_1=KP$, and the pixel coordinate of the second current image may be denoted as: $s_2p_2=K(RP+t)$, where $s_1$ and $s_2$ each denote the absolute depth of the successfully-matched keypoint in the first current image and the second current image, K, R, and t respectively denote an internal parameter of the camera and the motions (the rotation and the translation) of the camera between the first current image and the second current image, P denotes a three-dimensional coordinate point (X, Y, Z) of the successfully-matched keypoint, and $p_1$ and $p_2$ respectively denote pixel coordinates of a three-dimensional point in a space in the first current image and the second current image. In addition, a normalized plane coordinate of a pixel point in the first current image may be denoted as: $x_1=K^{-1}p_1$, and a normalized plane coordinate of a pixel point in the second current image may be denoted as: $x_2=K^{-1}p_2$.

In S306, the corresponding three-dimensional point cloud of each pixel point in the video is constructed according to the absolute depth of each keypoint in the video.

In S307, the high-precision map corresponding to the video is constructed according to the corresponding three-dimensional point cloud of each pixel point in the video.

According to the high-precision map construction method provided by the embodiment of the present application, the pose of the camera at each position point is calculated according to the pre-acquired video; the absolute depth of each keypoint in the video is calculated according to the pose of the camera at each position point; the corresponding three-dimensional point cloud of each pixel point in the video is constructed according to the absolute depth of each keypoint in the video; and the high-precision map corresponding to the video is constructed according to the corresponding three-dimensional point cloud of each pixel point in the video. That is, according to the present application, the video may be acquired with the low-cost devices, and the corresponding high-precision map is constructed according to the video. Thus, the high-cost laser devices are not needed to construct the high-precision map. In the existing high-precision map construction method, the laser point cloud data is typically used for constructing the map, that is, the semantic parsing is performed on the laser point cloud so that the category attribute of each point in the laser point cloud is identified, and then the vectorization is performed on the laser point cloud so that the vectorized map of the target region is obtained. In the present application, the technical means is adopted that the pose of the camera at each position point and the absolute depth of the camera at each keypoint are calculated so that the corresponding three-dimensional point cloud of each pixel point is constructed and the high-precision map is finally constructed. Therefore, the technical problems are overcome that in the related art, the laser point cloud data is used for constructing the map with the high-cost devices and therefore, the large-scale deployment cannot be performed and the timeliness and update range of the map construction cannot be ensured. According to the technical solutions provided by the present application, the high-precision map can be constructed with the low-cost devices, thereby ensuring the timeliness and update range of the map construction and facilitating the large-scale popularization and application. In addition, the technical solution in the embodiment of the present application is simple and convenient to implement and easy to popularize and has the wider application range.

Embodiment Four

Figure 4:
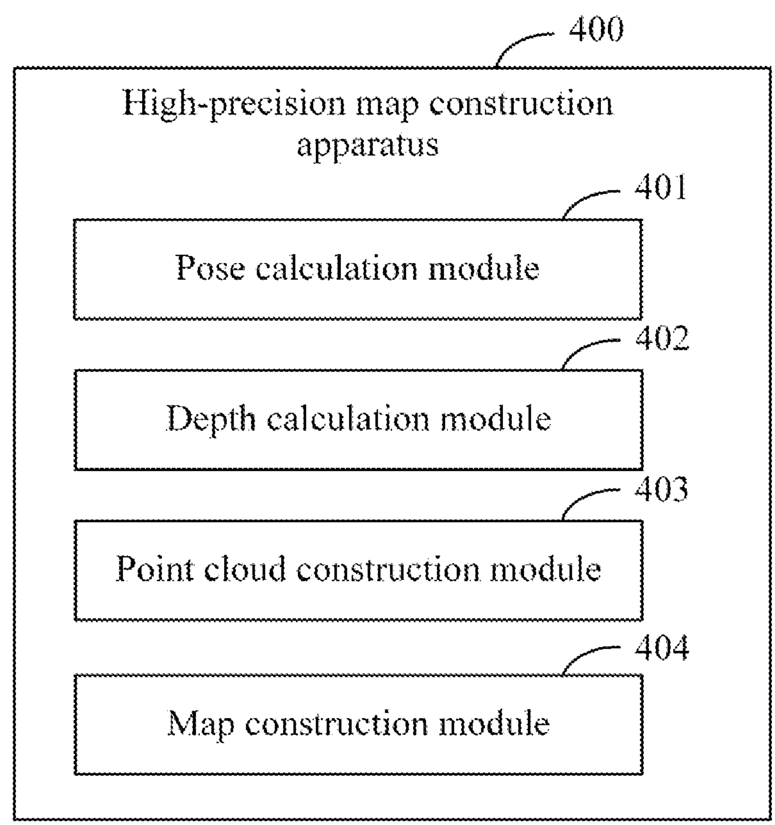
FIG. 4 is a structural diagram of a high-precision map construction apparatus according to an embodiment of the present application.

FIG. 4 is a structural diagram of a high-precision map construction apparatus according to an embodiment of the present application. As shown in FIG. 4, an apparatus 400 includes a pose calculation module 401, a depth calculation module 402, a point cloud construction module 403, and a map construction module 404.

The pose calculation module 401 is configured to calculate a pose of a camera at each position point according to a pre-acquired video.

The depth calculation module 402 is configured to calculate an absolute depth of each keypoint in the video according to the pose of the camera at each position point.

The point cloud construction module 403 is configured to construct, according to the absolute depth of each keypoint in the video, a corresponding three-dimensional point cloud of each pixel point in the video.

The map construction module 404 is configured to construct, according to the corresponding three-dimensional point cloud of each pixel point in the video, a high-precision map corresponding to the video.

Further, the pose calculation module 401 is configured to: extract GPS information and IMU data of the camera at each position point according to the video; and acquire the pose of the camera at each position point according to the GPS information and the IMU data of the camera at each position point, where the pose includes degrees of freedom in which the camera moves along directions of three orthogonal coordinate axes X, Y, and Z and degrees of freedom in which the camera rotates around the three orthogonal coordinate axes X, Y, and Z.

Further, the depth calculation module 402 is configured to: extract two images from the video as a current image pair, where the current image pair includes a first current image and a second current image; extract at least one keypoint from the first current image and the second current image separately and match each keypoint in the first current image with each keypoint in the second current image; calculate an absolute depth of each successfully-matched keypoint in the first current image and an absolute depth of each successfully-matched keypoint in the second current image according to a pose of the camera at a position point at which the first current image is shot and a pose of the camera at a position point at which the second current image is shot if the at least one keypoint existing in the first current image is matched with the at least one keypoint in the second current image successfully.

Further, the depth calculation module 402 is configured to: construct pixel coordinates of the first current image and the second current image and normalized plane coordinates of pixel points in the first current image and the second current image according to the pose of the camera at the position point at which the first current image is shot and the pose of the camera at the position point at which the second current image is shot; and calculate the absolute depth of each successfully-matched keypoint in the first current image and the absolute depth of each successfully-matched keypoint in the second current image according to the pixel coordinates of the first current image and the second current image and the normalized plane coordinates of the pixel points in the first current image and the second current image.

Further, the map construction module 404 is configured to: acquire a three-dimensional point cloud of each map element in each image according to a predetermined correspondence relationship between each pixel point and the corresponding three-dimensional point cloud; perform a vectorization operation on the three-dimensional point cloud of each map element so that a vectorization result of each map element is acquired; and construct, according to the vectorization result of each map element, the high-precision map corresponding to the video.

Further, the map construction module 404 is configured to: perform semantic segmentation on each image in the video so that category information of each map element in each image is acquired; and acquire the three-dimensional point cloud of each map element in the video according to the category information of each map element.

The preceding high-precision map construction apparatus may execute the method provided by any embodiment of the present application and has functional modules and beneficial effects corresponding to the executed method. For technical details not described in detail in this embodiment, reference may be made to the high-precision map construction method provided by any embodiment of the present application.

Operations, including acquisition, storage, and application, on the user's personal information involved in the technical solutions of the present disclosure conform to relevant laws and regulations and do not violate the public policy doctrine.

Embodiment Five

According to an embodiment of the present disclosure, the present disclosure further provides an electronic device, a readable storage medium, and a computer program product.

Figure 5:
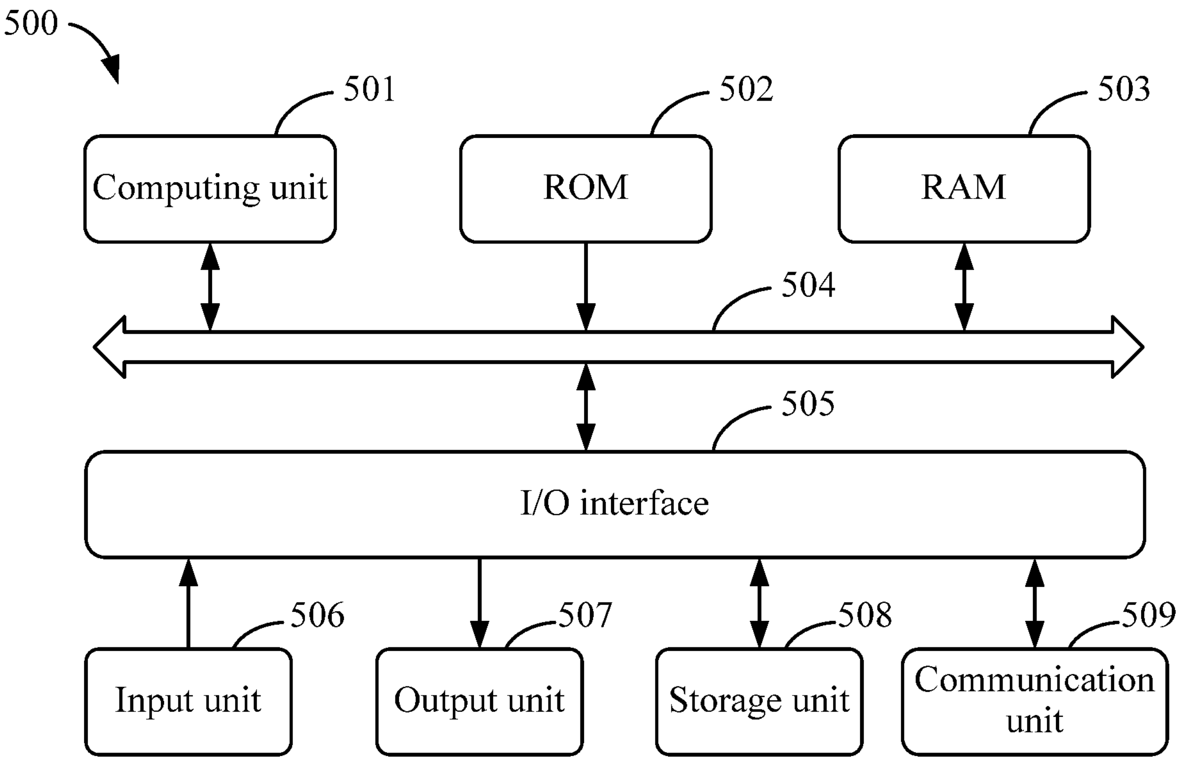
FIG. 5 is a block diagram of an electronic device for implementing a high-precision map construction method according to an embodiment of the present application.

FIG. 5 is a block diagram illustrative of an example electronic device 500 which may be configured to implement the embodiment of the present disclosure. The electronic device is intended to represent various forms of digital computers, for example, a laptop computer, a desktop computer, a worktable, a personal digital assistant, a server, a blade server, a mainframe computer, or another applicable computer. The electronic device may also represent various forms of mobile apparatuses, for example, a personal digital assistant, a cellphone, a smartphone, a wearable device, or another similar computing apparatus. Herein the shown components, the connections and relationships between these components, and the functions of these components are illustrative only and are not intended to limit the implementation of the present disclosure as described and/or claimed herein.

As shown in FIG. 5, the device 500 includes a computing unit 501. The computing unit 501 may perform various appropriate actions and processing according to a computer program stored in a read-only memory (ROM) 502 or a computer program loaded into a random-access memory (RAM) 503 from a storage unit 508. Various programs and data required for the operation of the device 500 may also be stored in the RAM 503. The computing unit 501, the ROM 502, and the RAM 503 are connected to each other through a bus 504. An input/output (I/O) interface 505 is also connected to the bus 504.

Multiple components in the device 500 are connected to the I/O interface 505. The multiple components include an input unit 506 such as a keyboard or a mouse, an output unit 507 such as various types of displays or speakers, the storage unit 508 such as a magnetic disk or an optical disk, and a communication unit 509 such as a network card, a modem, or a wireless communication transceiver. The communication unit 509 allows the device 500 to exchange information/data with other devices over a computer network such as the Internet and/or various telecommunications networks.

The computing unit 501 may be various general-purpose and/or special-purpose processing components having processing and computing capabilities. Examples of the computing unit 501 include, but are not limited to, a central processing unit (CPU), a graphics processing unit (GPU), various special-purpose artificial intelligence (AI) computing chips, various computing unit executing machine learning models and algorithms, a digital signal processor (DSP), and any appropriate processor, controller, and microcontroller. The computing unit 501 executes various preceding methods and processing such as the high-precision map construction method. For example, in some embodiments, the high-precision map construction method may be implemented as computer software programs tangibly contained in a machine-readable medium such as the storage unit 508. In some embodiments, part or all of computer programs may be loaded and/or installed on the device 500 via the ROM 502 and/or the communication unit 509. When the computer programs are loaded to the RAM 503 and executed by the computing unit 501, one or more steps of the preceding high-precision map construction method may be performed. Alternatively, in other embodiments, the computing unit 501 may be configured, in any other appropriate manner (for example, by means of firmware), to execute the high-precision map construction method.

Herein various embodiments of the preceding systems and techniques may be implemented in digital electronic circuitry, integrated circuitry, field-programmable gate arrays (FPGAs), application-specific integrated circuits (ASICs), application-specific standard products (ASSPs), systems on chips (SoCs), complex programmable logic devices (CPLDs), computer hardware, firmware, software, and/or combinations thereof. The various embodiments may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input apparatus, and at least one output apparatus and transmitting data and instructions to the memory system, the at least one input apparatus, and the at least one output apparatus.

Program codes for implementation of the method of the present disclosure may be written in one programming language or any combination of multiple programming languages. These program codes may be provided for the processor or controller of a general-purpose computer, a special-purpose computer, or another programmable data processing apparatus such that the program codes, when executed by the processor or controller, cause functions/operations specified in the flowcharts and/or block diagrams to be implemented. The program codes may be executed entirely on a machine or may be executed partially on a machine. As a stand-alone software package, the program codes may be executed partially on a machine and partially on a remote machine or may be executed entirely on a remote machine or a server.

In the context of the present disclosure, the machine-readable medium may be a tangible medium which may include or store the program used by or used in conjunction with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any appropriate combination thereof. More specific examples of the machine-readable storage medium may include an electrical connection according to one or more wires, a portable computer disk, a hard disk, a random-access memory (RAM), a read-only memory (ROM), an erasable programmable read-only memory (EPROM), a flash memory, an optical fiber, a portable compact disc read-only memory (CD-ROM), an optical storage device, a magnetic storage device, or any appropriate combination thereof.

In order that interaction with the user is provided, the systems and techniques described herein may be implemented on a computer. The computer has a display apparatus (for example, a cathode-ray tube (CRT) or a liquid-crystal display (LCD) monitor) for displaying information to the user and a keyboard and a pointing apparatus (for example, a mouse or a trackball) through which the user can provide input for the computer. Other types of apparatuses may also be used for providing interaction with the user. For example, feedback provided for the user may be sensory feedback in any form (for example, visual feedback, auditory feedback, or haptic feedback). Moreover, input from the user may be received in any form (including acoustic input, voice input, or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which the user can interact with implementations of the systems and techniques described herein), or a computing system including any combination of such back-end, middleware or front-end components. The components of the system may be interconnected by any form or medium of digital data communication (for example, a communication network). Examples of the communication network include a local area network (LAN), a wide area network (WAN), and the Internet.

The computing system may include a client and a server. The client and the server are usually far away from each other and generally interact through the communication network. The relationship between the client and the server arises by virtue of computer programs running on respective computers and having a client-server relationship to each other. The server may be a cloud server, a server of a distributed system, or a server combined with a blockchain.

It is to be understood that various forms of the preceding flows may be used with steps reordered, added, or removed. For example, the steps described in the present disclosure may be executed in parallel, in sequence, or in a different order as long as the desired results of the technical solutions disclosed in the present disclosure can be achieved. The execution sequence of these steps is not limited herein.

The scope of the present disclosure is not limited to the preceding embodiments. It is to be understood by those skilled in the art that various modifications, combinations, sub-combinations, and substitutions may be made according to design requirements and other factors. Any modification, equivalent substitution, improvement, and the like made within the spirit and principle of the present disclosure fall within the scope of the present disclosure.

What is claimed is:

1. A high-precision map construction method, applied to an electronic device disposed on a vehicle in a field of autonomous driving and comprising:

calculating a pose of a camera at each position point according to a pre-acquired video acquired by devices that have lower cost and are more feasible for large-scale deployment compared to laser devices;

calculating an absolute depth of each keypoint in the pre-acquired video according to the pose of the camera at each position point;

according to the absolute depth of each keypoint in the pre-acquired video, constructing a corresponding three-dimensional point cloud of each pixel point in the pre-acquired video; and according to the corresponding three-dimensional point cloud of each pixel point in the pre-acquired video, constructing a high-precision map corresponding to the pre-acquired video to provide reliable road information for the autonomous driving, and ensure safety of the autonomous driving;

wherein calculating the absolute depth of each keypoint in the pre-acquired video according to the pose of the camera at each position point comprises:

extracting two images from the pre-acquired video as a current image pair, wherein the current image pair comprises a first current image and a second current image;

extracting at least one keypoint from the first current image and at least one keypoint from the second current image, and matching the at least one keypoint in the first current image with the at least one keypoint in the second current image one by one to obtain at least one successfully-matched keypoint; and calculating an absolute depth of each of the at least one successfully-matched keypoint in the first current image according to a pose of the camera at a position point at which the first current image is shot, and calculating an absolute depth of each successfully-matched keypoint in the second current image according to a pose of the camera at a position point at which the second current image is shot;

wherein calculating the absolute depth of each of the at least one successfully-matched keypoint in the first current image and the absolute depth of each of the at least one successfully-matched keypoint in the second current image comprises:

constructing a pixel coordinate of the first current image and a normalized plane coordinate of pixel points in the first current image according to the pose of the camera at the position point at which the first current image is shot, and constructing a pixel coordinate of the second current image and a normalized plane coordinate of pixel points in the second current image according to the pose of the camera at the position point at which the second current image is shot; and calculating the absolute depth of each of the at least one successfully-matched keypoint in the first current image according to the pixel coordinate of the first current image and the normalized plane coordinate of the pixel points in the first current image, and calculating the absolute depth of each of the at least one successfully-matched keypoint in the second current image according to the pixel coordinate of the second current image and the normalized plane coordinate of the pixel points in the second current image;

wherein the method further comprises: filtering pixel points with inconsistent absolute depths in the pre-acquired video through comparing a consistency relationship between absolute depths of diffused pixel points and an absolute depth of each successfully-matched keypoint in the pre-acquired video; and wherein according to the corresponding three-dimensional point cloud of each pixel point in the pre-acquired video, constructing the high-precision map corresponding to the pre-acquired video comprises:

obtaining three-dimensional point clouds of a road scene that comprise semantic information from each image in the pre-acquired video;

obtaining a point cloud cluster belonging to a same category by combining the three-dimensional point clouds of the road scene;

performing a vectorization operation on the obtained point cloud cluster to obtain a vectorization result, wherein the vectorization result is classified into a three-dimensional type, a planar type, and a linear type; for the three-dimensional type, the vectorization operation is performed using three-dimensional bounding boxes of outer boundaries of the point cloud cluster; and for the planar type and the linear type, the vectorization operation is performed by defining the three-dimensional bounding boxes of the outer boundaries of the point cloud cluster and compressing the three-dimensional bounding boxes to form a two-dimensional planar vectorization result.

2. The method according to claim 1, wherein according to the corresponding three-dimensional point cloud of each pixel point in the video, constructing the high-precision map corresponding to the pre-acquired video comprises:

acquiring a three-dimensional point cloud of each map element in each image in the pre-acquired video according to a predetermined correspondence relationship between each pixel point and the corresponding three-dimensional point cloud;

performing the vectorization operation on the three-dimensional point cloud of each map element to acquire a vectorization result of each map element; and according to the vectorization result of each map element, constructing the high-precision map corresponding to the pre-acquired video.

3. The method according to claim 2, wherein acquiring the three-dimensional point cloud of each map element in the pre-acquired video according to the predetermined correspondence relationship between each pixel point and the corresponding three-dimensional point cloud comprises:

performing semantic segmentation on each image in the pre-acquired video to acquire category information of each map element in each image; and acquiring the three-dimensional point cloud of each map element in the video according to the category information of each map element.

4. The method according to claim 1, wherein calculating the pose of the camera at each position point according to the pre-acquired video acquired by the devices that have lower cost and are more feasible for large-scale deployment compared to the laser devices comprises:

extracting Global Positioning System (GPS) information and inertial measurement unit (IMU) data of the camera at each position point according to the pre-acquired video; and acquiring the pose of the camera at each position point according to the GPS information and the IMU data of the camera at each position point, wherein the pose comprises a degree of freedom in which the camera moves along a direction of each of three orthogonal coordinate axes X, Y, and Z and a degree of freedom in which the camera rotates around each of the three orthogonal coordinate axes X, Y, and Z.

5. An electronic device, disposed on a vehicle in a field of autonomous driving and comprising:

at least one processor; and a memory communicatively connected to the at least one processor, wherein the memory stores instructions executable by the at least one processor, and the instructions are executed by the at least one processor to cause the at least one processor to execute:

calculating a pose of a camera at each position point according to a pre-acquired video acquired by devices that have lower cost and are more feasible for large-scale deployment compared to laser devices;

calculating an absolute depth of each keypoint in the pre-acquired video according to the pose of the camera at each position point;

according to the absolute depth of each keypoint in the pre-acquired video, constructing a corresponding three-dimensional point cloud of each pixel point in the pre-acquired video; and according to the corresponding three-dimensional point cloud of each pixel point in the pre-acquired video, constructing a high-precision map corresponding to the pre-acquired video to provide reliable road information for the autonomous driving, and ensure safety of the autonomous driving;

wherein the at least one processor is configured to:

extract two images from the pre-acquired video as a current image pair, wherein the current image pair comprises a first current image and a second current image;

extract at least one keypoint from the first current image and at least one keypoint from the second current image, and match the at least one keypoint in the first current image with the at least one keypoint in the second current image one by one to obtain at least one successfully-matched keypoint;

calculate an absolute depth of each of the at least one successfully-matched keypoint in the first current image according to a pose of the camera at a position point at which the first current image is shot, and calculate an absolute depth of each successfully-matched keypoint in the second current image according to a pose of the camera at a position point at which the second current image is shot; and wherein the at least one processor is configured to:

construct a pixel coordinate of the first current image and a normalized plane coordinate of pixel points in the first current image according to the pose of the camera at the position point at which the first current image is shot, and construct a pixel coordinate of the second current image and a normalized plane coordinate of pixel points in the second current image according to the pose of the camera at the position point at which the second current image is shot; and calculate the absolute depth of each of the at least one successfully-matched keypoint in the first current image according to the pixel coordinate of the first current image and the normalized plane coordinate of the pixel points in the first current image, and calculate the absolute depth of each of the at least one successfully-matched keypoint in the second current image according to the pixel coordinate of the second current image and the normalized plane coordinate of the pixel points in the second current image;

wherein the at least one processor is configured to: filter pixel points with inconsistent absolute depths in the pre-acquired video through comparing a consistency relationship between absolute depths of diffused pixel points and an absolute depth of each successfully-matched keypoint in the pre-acquired video; and wherein the at least one processor is configured to:

obtain three-dimensional point clouds of a road scene that comprise semantic information from each image in the pre-acquired video;

obtain a point cloud cluster belonging to a same category by combining the three-dimensional point clouds of the road scene;

perform a vectorization operation on the obtained point cloud cluster to obtain a vectorization result, wherein the vectorization result is classified into a three-dimensional type, a planar type, and a linear type; for the three-dimensional type, the vectorization operation is performed using three-dimensional bounding boxes of outer boundaries of the point cloud cluster; and for the planar type and the linear type, the vectorization operation is performed by defining the three-dimensional bounding boxes of the outer boundaries of the point cloud cluster and compressing the three-dimensional bounding boxes to form a two-dimensional planar vectorization result.

6. The electronic device according to claim 5, wherein according to the corresponding three-dimensional point cloud of each pixel point in the video, the at least one processor constructs the high-precision map corresponding to the pre-acquired video by:

acquiring a three-dimensional point cloud of each map element in each image in the pre-acquired video according to a predetermined correspondence relationship between each pixel point and the corresponding three-dimensional point cloud;

performing the vectorization operation on the three-dimensional point cloud of each map element to acquire a vectorization result of each map element; and according to the vectorization result of each map element, constructing the high-precision map corresponding to the pre-acquired video.

7. The electronic device according to claim 6, wherein the at least one processor acquires the three-dimensional point cloud of each map element in the pre-acquired video according to the predetermined correspondence relationship between each pixel point and the corresponding three-dimensional point cloud by:

performing semantic segmentation on each image in the pre-acquired video to acquire category information of each map element in each image; and acquiring the three-dimensional point cloud of each map element in the video according to the category information of each map element.

8. The electronic device according to claim 5, wherein the at least one processor calculates the pose of the camera at each position point according to the pre-acquired video acquired by the devices that have lower cost and are more feasible for large-scale deployment compared to the laser devices by:

extracting Global Positioning System (GPS) information and inertial measurement unit (IMU) data of the camera at each position point according to the pre-acquired video; and acquiring the pose of the camera at each position point according to the GPS information and the IMU data of the camera at each position point, wherein the pose comprises a degree of freedom in which the camera moves along a direction of each of three orthogonal coordinate axes X, Y, and Z and a degree of freedom in which the camera rotates around each of the three orthogonal coordinate axes X, Y, and Z.

9. A non-transitory computer-readable storage medium storing computer instructions, wherein the computer instructions are configured to cause a computer to execute:

calculating a pose of a camera at each position point according to a pre-acquired video acquired by devices that have lower cost and are more feasible for large-scale deployment compared to laser devices;

calculating an absolute depth of each keypoint in the pre-acquired video according to the pose of the camera at each position point;

according to the absolute depth of each keypoint in the pre-acquired video, constructing a corresponding three-dimensional point cloud of each pixel point in the pre-acquired video; and according to the corresponding three-dimensional point cloud of each pixel point in the pre-acquired video, constructing a high-precision map corresponding to the pre-acquired video to provide reliable road information for the autonomous driving, and ensure safety of the autonomous driving;

wherein the computer calculates the absolute depth of each keypoint in the pre-acquired video according to the pose of the camera at each position point by:

extracting two images from the pre-acquired video as a current image pair, wherein the current image pair comprises a first current image and a second current image;

extracting at least one keypoint from the first current image and at least one keypoint from the second current image, and matching the at least one keypoint in the first current image with the at least one keypoint in the second current image one by one to obtain at least one successfully-matched keypoint; and calculating an absolute depth of each of the at least one successfully-matched keypoint in the first current image according to a pose of the camera at a position point at which the first current image is shot, and calculating an absolute depth of each successfully-matched keypoint in the second current image according to a pose of the camera at a position point at which the second current image is shot; and wherein the computer calculates the absolute depth of each of the at least one successfully-matched keypoint in the first current image and the absolute depth of each of the at least one successfully-matched keypoint in the second current image by:

constructing a pixel coordinate of the first current image and a normalized plane coordinate of pixel points in the first current image according to the pose of the camera at the position point at which the first current image is shot, and constructing a pixel coordinate of the second current image and a normalized plane coordinate of pixel points in the second current image according to the pose of the camera at the position point at which the second current image is shot; and calculating the absolute depth of each of the at least one successfully-matched keypoint in the first current image according to the pixel coordinate of the first current image and the normalized plane coordinate of the pixel points in the first current image, and calculating the absolute depth of each of the at least one successfully-matched keypoint in the second current image according to the pixel coordinate of the second current image and the normalized plane coordinate of the pixel points in the second current image;

wherein the computer instructions are configured to cause the computer to further execute:

filtering pixel points with inconsistent absolute depths in the pre-acquired video through comparing a consistency relationship between absolute depths of diffused pixel points and an absolute depth of each successfully-matched keypoint in the pre-acquired video; and wherein the computer constructs the high-precision map corresponding to the pre-acquired video according to the corresponding three-dimensional point cloud of each pixel point in the pre-acquired video by:

obtaining three-dimensional point clouds of a road scene that comprise semantic information from each image in the pre-acquired video;

obtaining a point cloud cluster belonging to a same category by combining the three-dimensional point clouds of the road scene;

performing a vectorization operation on the obtained point cloud cluster to obtain a vectorization result, wherein the vectorization result is classified into a three-dimensional type, a planar type, and a linear type; for the three-dimensional type, the vectorization operation is performed using three-dimensional bounding boxes of outer boundaries of the point cloud cluster; and for the planar type and the linear type, the vectorization operation is performed by defining the three-dimensional bounding boxes of the outer boundaries of the point cloud cluster and compressing the three-dimensional bounding boxes to form a two-dimensional planar vectorization result.

10. The storage medium according to claim 9, wherein according to the corresponding three-dimensional point cloud of each pixel point in the video, the computer constructs the high-precision map corresponding to the pre-acquired video by:

acquiring a three-dimensional point cloud of each map element in each image in the pre-acquired video according to a predetermined correspondence relationship between each pixel point and the corresponding three-dimensional point cloud;

performing the vectorization operation on the three-dimensional point cloud of each map element to acquire a vectorization result of each map element; and according to the vectorization result of each map element, constructing the high-precision map corresponding to the pre-acquired video.

11. The storage medium according to claim 10, wherein the computer acquires the three-dimensional point cloud of each map element in the pre-acquired video according to the predetermined correspondence relationship between each pixel point and the corresponding three-dimensional point cloud by:

performing semantic segmentation on each image in the pre-acquired video to acquire category information of each map element in each image; and acquiring the three-dimensional point cloud of each map element in the video according to the category information of each map element.

12. The non-transitory computer-readable storage medium according to claim 9, wherein the computer calculates the pose of the camera at each position point according to the pre-acquired video acquired by the devices that have lower cost and are more feasible for large-scale deployment compared to the laser devices by:

extracting Global Positioning System (GPS) information and inertial measurement unit (IMU) data of the camera at each position point according to the pre-acquired video; and acquiring the pose of the camera at each position point according to the GPS information and the IMU data of the camera at each position point, wherein the pose comprises a degree of freedom in which the camera moves along a direction of each of three orthogonal coordinate axes X, Y, and Z and a degree of freedom in which the camera rotates around each of the three orthogonal coordinate axes X, Y, and Z.

* * * * *